United States Patent [19]

Leigers

[11] Patent Number: 4,471,602
[45] Date of Patent: Sep. 18, 1984

[54] SELF-PROPELLED SUGAR CANE HARVESTER

[75] Inventor: Günter Leigers, Harsewinkel, Fed. Rep. of Germany

[73] Assignee: Claas OHG, Harsewinkel, Fed. Rep. of Germany

[21] Appl. No.: 459,617

[22] Filed: Jan. 20, 1983

[30] Foreign Application Priority Data

Jan. 27, 1982 [DE] Fed. Rep. of Germany ... 8201901[U]

[51] Int. Cl.³ ............................................. A01D 45/10
[52] U.S. Cl. ...................................... 56/13.9; 56/14.5; 464/182; 403/337; 241/84; 241/285 A
[58] Field of Search ................... 56/13.9, 14.5; 403/26, 403/337, 287; 464/182, 179; 241/285 A, 84, 101.5

[56] References Cited

U.S. PATENT DOCUMENTS

| 2,012,669 | 8/1935 | Lapsley | 403/337 |
| 3,388,614 | 6/1968 | DeCoye De Castelet | 403/337 |
| 4,035,996 | 7/1977 | Fernandez et al. | 56/13.9 |
| 4,273,295 | 6/1981 | Pollmann | 241/285 A |
| 4,279,603 | 7/1981 | Harcourt et al. | 403/337 |

FOREIGN PATENT DOCUMENTS 625754 7/1949 United Kingdom ............... 464/182

Primary Examiner—Gene Mancene
Assistant Examiner—David I. Tarnoff
Attorney, Agent, or Firm—Michael J. Striker

[57] ABSTRACT

A self-propelled sugar cane harvester has a plurality of cutting rollers cooperating with each other in pairs to cut cane sticks. The cutting rollers are rotatably supported in opposite walls of the harvester housing. Each roller has two opposite flanges at its ends, which are releasably connected to the flanges rotatably supported in the walls of the housing. Disassembling of each individual roller is achieved by merely releasing the flanges of the roller from the flanges supported in the housing walls, whereby the roller can be easily pulled out from the housing for repair or any other operation.

3 Claims, 2 Drawing Figures

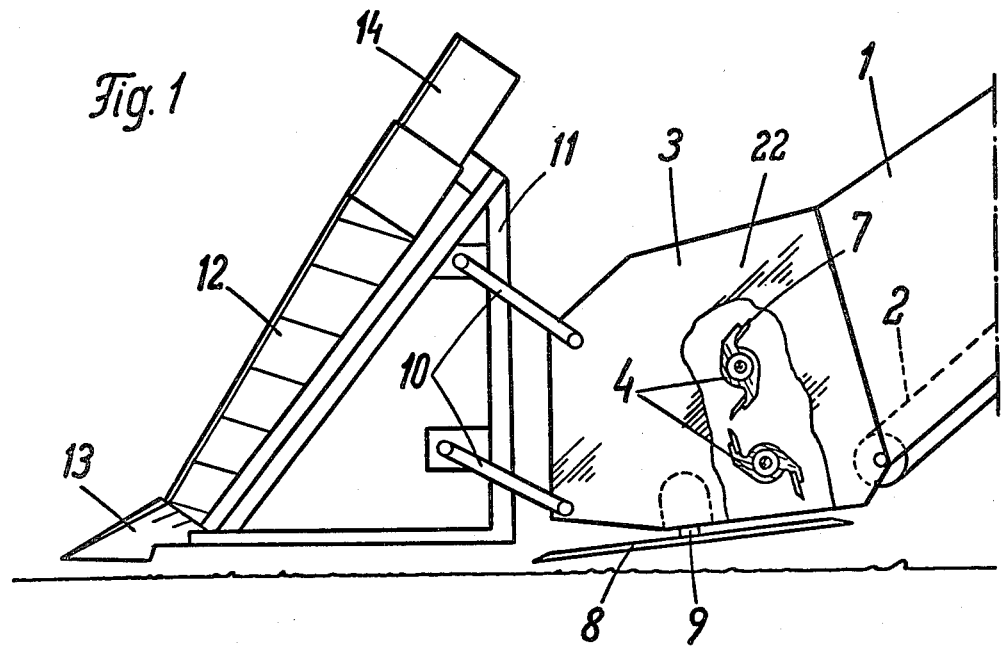
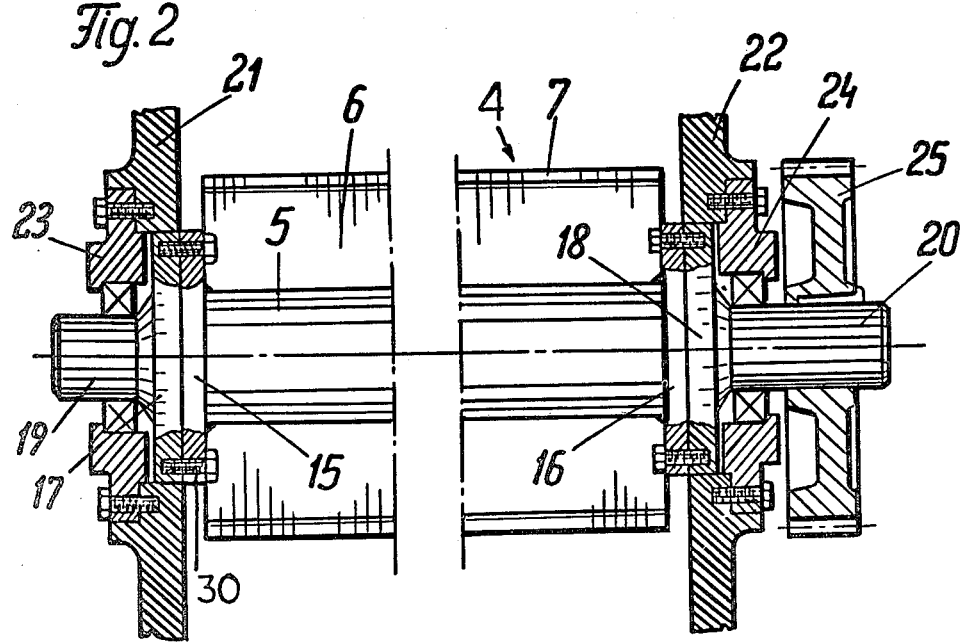

SELF-PROPELLED SUGAR CANE HARVESTER

BACKGROUND OF THE INVENTION

The present invention relates to a sugar cane harvester in general, and to a mounting assembly of a chopping cutter or roller in the harvester housing in particular.

Sugar cane harvesters known in the art are provided with a number of rotatable cutter rollers cooperating with each other in pairs for cutting cane sticks. Each individual roller is supported in the housing for its rotation and is comprised of a longitudinal axle or shaft supported at its ends in bearing journals mounted in the housing walls. The axle is usually formed integrally with a shaped forged supporting element to which suitable chopping blades are connected by screws or bolts. Due to such one-piece construction of the individual chopping roller and its considerable heavy weight assembling and disassembling of the rollers in the housing of the harvester have been found extremely difficult.

SUMMARY OF THE INVENTION

It is an object of the present invention to provide an improved sugar cane harvester.

It is a further object of the invention to provide an improved arrangement for mounting cutting or chopping rollers in the housing of the harvester.

It is a still further object of the invention to provide a self-propelled sugar cane harvester in which the assembling and disassembling of individual chopping rollers, which of course should be interchangeable, in the harvester housing is essentially facilitated. Therefore, such operations as repair of components of the chopping rollers are particularly facilitated.

These and other objects of the invention are attained by a self-propelled sugar cane harvester, comprising a housing having lateral walls spaced from each other; a plurality of rotary chopping rollers cooperating with each other in pairs for cutting sugar canes and positioned in said housing, each individual roller including a shaft portion, a shaped portion connected to said shaft portion and carrying chopping blades thereon, the shaft portion having two opposite ends, and a pair of flanges each connected to the respective end of the shaft portion; and a pair of additional flanges releasably connectable to the respective first mentioned flanges and provided with axles rotationally supported in the respective later walls of the housing.

Due to the structure of the chopping roller and its mounting in the lateral walls of the housing the individual roller can after releasing the flanges of the roller from the flanges supported in the later walls of the housing, be easily lifted from the lateral walls by any suitable for example by a crane or a fork stacker and pulled out from the housing.

According to further features of the invention at least one of the axles may be displaceable in the direction of an axis of the shaft portion of the roller. Due to such a structure more room can be provided for bringing the components of the chopping roller into place during the assembly thereof.

The lateral walls of the harvester housing may have openings for receiving said first mentioned flanges therein, the diameters of said openings being larger than the outer diameters of said first mentioned flanges.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a partial schematic view of a selfpropelled sugar cane harvester according to the invention, with a portion of the lateral wall of its housing broken; and FIG. 2 is a sectional view through one chopping roller mounted in the lateral walls of the harvester housing, on the enlarged scale.

DETAILED DESCRIPTION OF THE PREFERRED EMBODIMENTS

Referring now to the drawings, and first to FIG. 1 it will be seen that reference character 1 designates a front housing closure of the sugar cane harvester only partially illustrated in the drawings for the sake of clarity. A longitudinal conveyor or elevator 2 is mounted in the housing of the harvester for conveying chopped sugar canes for further processing. An end portion 3 of the housing is connected to the housing closure 1. The housing portion 3 includes two opposite lateral walls 21 and 22 between which a pair of chopping rollers 4 are positioned. Chopping rollers are rotatably supported in the walls 21 and 22.

With reference to FIG. 2 it is seen that each individual chopping roller 4 includes an axle or shaft 5 with a shaped portion 6 formed thereon. Two suitable cutters or blades 7 are supported on the shaped portion 6. The harvester is further provided in the known manner with blade-like discs 8 disposed below chopping rollers 4 (FIG. 1) and displaced forwardly of them some distance. Blade-like discs 8 are rotatably supported on a pivot 9 to which they are perpendicular. Means for rotation of discs 8 are conventional and not shown in the drawings.

The housing portion 3 carries a frame 11 by means of rods 10 which can move upwardly and downwardly thus causing the respective up and down movement of frame 11. A rotatable sugar cane divider 12 provided with dividing spikes 13 at the at the lower end thereof is supported on the frame 11. The rotation of sugar cane divider 12 is caused by means of an oil motor 14 in the known manner.

Referring back to FIG. 2, it is recognized that each individual chopping roller 4 is connected at the opposite ends of its shaft 5 to flanges 15 and 16, respectively. Flange 15 is attached to an additional flange 17 by bolts 30 or any other suitable fastening means whereas flange 16 is connected to another additional flange 18 also, for example by bolts. Both flanges 17 and 18 carry end axles or stumps 19 and 20, respectively which in turn are supported in the lateral walls 21 and 22 of housing portion 3 by means of bearings and brackets 23, 24. Brackets 23, 24 are screwed to the respective walls 21, 22. For driving the chopping roller 4 a drive spur gear 25 is provided which is mounted on stump 20 for rotation therewith. The drive for the rotation of spur gear 25 is conventional and therefore not described herein in detail. In order to obtain an unobjectionable rotation flanges 15 and 17 and flanges 16 and 18 are held in position with respect to each other by additional centering or aligning means not shown herein. It is understood that any conventional centering means may be employed in the assembly of the chopping roller.

For disassembling of the chopping roller mounted in the housing portion 3 it is only necessary to release flanges 15 and 17 and flanges 16 and 18 from each other by merely loosening the respective bolts such that the chopping roller 4 can be then lifted out from the housing, for example by means of a crane or fork stacker without, however disassembling of end axles or stumps 19 and 20 and the drive spur gear 25.

It is possible to loose the bolts between flanges 15 and 17 or 16 and 18, respectively, and to displace either one or both axles 19 and 20 together with the assigned flanges 17 or 18 towards or away from each other in the axial direction whereby the disassembly of the roller 4 will be facilitated.

The diameters of the openings provided in the lateral walls 21, 22 for receiving flanges 17 and 18 therethrough are larger than the outer diameters of flanges 17 and 18.

It will be understood that each of the elements described above, or tow or more together, may also find a useful application in other types of sugar cane harvesters differing from the types described above.

While the invention has been illustrated and described as embodied in a sugar cane harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled sugar can harvester, comprising a housing having lateral walls spaced from each other; a plurality of rotary chopping rollers cooperating with each other in pairs for cutting cane sticks and positioned in said housing, each individual roller including a shaft portion and a shaped portion connected to said shaft portion and carrying chopping blades thereon, said shaft portion having two opposite ends and a pair of flanges each connected to the respective end of said shaft portion; and a pair of additional flanges releasably connectable to the respective first mentioned flanges and provided with axles rotationally supported in the respective lateral walls of said housing; at least one of said axles with the assigned additional flange being displacable in the direction of an axis of said shaft portion to and away from the second one of said axles.

2. The harvester as defined in claim 1, said lateral walls having openings for receiving said first mentioned flanges therein, the diameters of said openings being larger than the outer diameters of said first mentioned flanges.

3. The harvester as defined in claim 1, further including releasable means for connecting said first mentioned flanges to the respective additional flanges whereby each individual roller can be easily disassembled and pulled out from said housing after releasing said means.

* * * * *